US008504844B2

(12) United States Patent
Browning

(10) Patent No.: US 8,504,844 B2
(45) Date of Patent: Aug. 6, 2013

(54) SYSTEM, METHOD, AND COMPUTER-READABLE MEDIUM FOR CRYPTOGRAPHIC KEY ROTATION IN A DATABASE SYSTEM

(75) Inventor: James Browning, Columbia, SC (US)

(73) Assignee: Teradata US, Inc., Dayton, OH (US)

( * ) Notice: Subject to any disclaimer, the term of this patent is extended or adjusted under 35 U.S.C. 154(b) by 445 days.

(21) Appl. No.: 12/339,179

(22) Filed: Dec. 19, 2008

(65) Prior Publication Data
US 2010/0161995 A1  Jun. 24, 2010

(51) Int. Cl.
*G06F 21/00* (2006.01)
(52) U.S. Cl.
USPC .......................................................... 713/189
(58) Field of Classification Search
USPC ................... 726/2, 6, 26; 713/156, 155, 158, 713/164, 166, 189, 193; 380/200, 201, 277, 380/279, 28–30; 709/227, 228, 225; 707/100, 707/103, 200, 694
See application file for complete search history.

(56) References Cited

U.S. PATENT DOCUMENTS

| | | | |
|---|---|---|---|
| 5,805,706 A | 9/1998 | Davis | |
| 6,937,726 B1 | 8/2005 | Wang | |
| 7,111,005 B1 * | 9/2006 | Wessman | ......................... 707/9 |
| 2003/0021417 A1 * | 1/2003 | Vasic et al. | .................... 380/277 |
| 2006/0236104 A1 * | 10/2006 | Wong et al. | ................... 713/168 |
| 2007/0079119 A1 | 4/2007 | Mattson et al. | |
| 2007/0201700 A1 * | 8/2007 | Hacigumus | ................... 380/277 |

* cited by examiner

*Primary Examiner* — Brandon Hoffman
*Assistant Examiner* — Hee Song
(74) *Attorney, Agent, or Firm* — Steve McDonald; Randy L. Campbell, Jr.

(57) ABSTRACT

A system, method, and computer-readable medium that facilitate key rotation without disrupting database access are provided. Generation identifiers that specify a particular encryption key are stored in association with cipher text of encrypted columns in database tables. When data is to be read from an encrypted column, the cipher text is read along with the associated generation identifier. An encryption key corresponding to the generation identifier is then read to decrypt the cipher text. When data is to be written to the encrypted column, a most recent encryption key is retrieved from the key repository to encrypt the data. The cipher text is then written to the encrypted column in association with the generation identifier of the key used to encrypt the data. Advantageously, the key rotation may be performed without requiring that the table or database to be taken offline or otherwise unavailable during key rotation.

20 Claims, 6 Drawing Sheets

Figure 5

Employee

| EmpNumber | LastName | FirstName | Phone | JobTitle | DeptNo | SSN | Sex | Salary |
|---|---|---|---|---|---|---|---|---|
| 21769 | Hinson | Ken | 1340 | Programmer | 4216 | hg6$D(*Bs+kHS@34 | M | 56240.00 |
| 21838 | Bolton | Caroline | 1715 | Manager | 4216 | lOe6$1*xV]lw0-bs | F | 72351.00 |
| 22041 | Nelson | Carrie | 5056 | Product Manager | 3856 | Yv^w45qA!-(jNGs8 | F | 48771.00 |
| 22399 | Sutton | Annie | 6228 | Admin | 4216 | *e^GGV3Fdvc90 -; | F | 28990.00 |
| 22410 | Hill | Marion | 2133 | Programmer | 4216 | y6$3Qx10_Dkl>,w# | F | 47621.00 |
| 22569 | Lewis | Ben | 4869 | Product Manager | 3856 | B38Few%1^0lhc5yS | M | 46354.00 |
| 22890 | Cothran | Mark | 4702 | Manager | 3245 | s2!bcx(dSA#1jco( | M | 69433.00 |
| 23450 | Payton | Jessica | 4991 | Marketing Specialist | 3245 | Gc$3*-+wHD1Sqxo4 | F | 48221.00 |
| 24108 | Shaw | Josh | 5205 | Programmer | 4216 | Pfb73h&Y&GH#Td#1 | M | 41295.00 |
| 24569 | Cureton | Frank | 9394 | Marketing Specialist | 3245 | J*^2bdg09M6dF#j? | M | 44566.00 |

Figure 6

| table | column | key |
|---|---|---|
| Employee | SSN | 'c286696d887c9aa0611bbb3e2025a45a'xbv |

SYSTEM, METHOD, AND COMPUTER-READABLE MEDIUM FOR CRYPTOGRAPHIC KEY ROTATION IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

To prevent the compromise of sensitive information (credit card numbers, social security numbers, etc.) when stored in databases, industry standards and security/privacy regulations often mandate the use of encryption. Such standards and laws include the Health Insurance Portability and Accountability Act of 1996 (HIPAA), the Payment Card Industry Data Security Standard (PCI DSS), and others.

Encryption is the process of translating data (clear text) into a form that is not interpretable (cipher text) should the data be compromised. This translation is done using strong cryptographic algorithms in conjunction with secret keys. The correct secret key is required to reverse the translation such that the original data can be interpreted.

Protection of the secret keys is critical to the security of the encrypted data. As such, key management best practices call for secure generation of keys, secure storage of keys, secure distribution of keys, restricted access to keys, and periodic key rotation.

Key rotation is generally defined as a process for replacement of a cryptographic key and includes the process of decrypting data with the original cryptographic key and subsequent re-encryption of the data with the new cryptographic key. Key rotation is often used when there is some indication that a key has been compromised. However, some regulations (such as PCI DSS) simply mandate periodic changing of keys "as deemed necessary."

Most database encryption solutions provide for key rotation and generally will include utilities to perform the decryption/re-encryption operations and some implementations require that the database be offline during the key rotation process. But, in all cases, the key rotation process tends to be very CPU intensive and disruptive of normal query processing. This is particularly true if the amount of encrypted data is large—as is common for many data warehouse implementations. Further, unavailability of the data during the key rotation process may adversely affect applications involving tactical queries that are common for many active data warehouse implementations.

SUMMARY

Disclosed embodiments provide a system, method, and computer readable medium for key rotation without disrupting database access. Generation identifiers that specify a particular encryption key are stored in association with cipher text of encrypted columns in database tables. When data is to be read from an encrypted column, the cipher text is read along with the associated generation identifier. An encryption key corresponding to the generation identifier is then used to decrypt the cipher text. When data is to be written to the encrypted column, a most recent encryption key is retrieved from the key repository to encrypt the data. The cipher text is then written to the encrypted column in association with the generation identifier of the key used to encrypt the data. Advantageously, the key rotation may be performed without requiring that the table or database to be taken offline or otherwise unavailable during key rotation.

BRIEF DESCRIPTION OF THE DRAWINGS

Aspects of the present disclosure are best understood from the following detailed description when read with the accompanying figures, in which:

FIG. 5 is a diagrammatic representation of an exemplary table on which mechanisms for cryptographic key rotation may be implemented;

FIG. 6 is a diagrammatic representation of a key repository;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
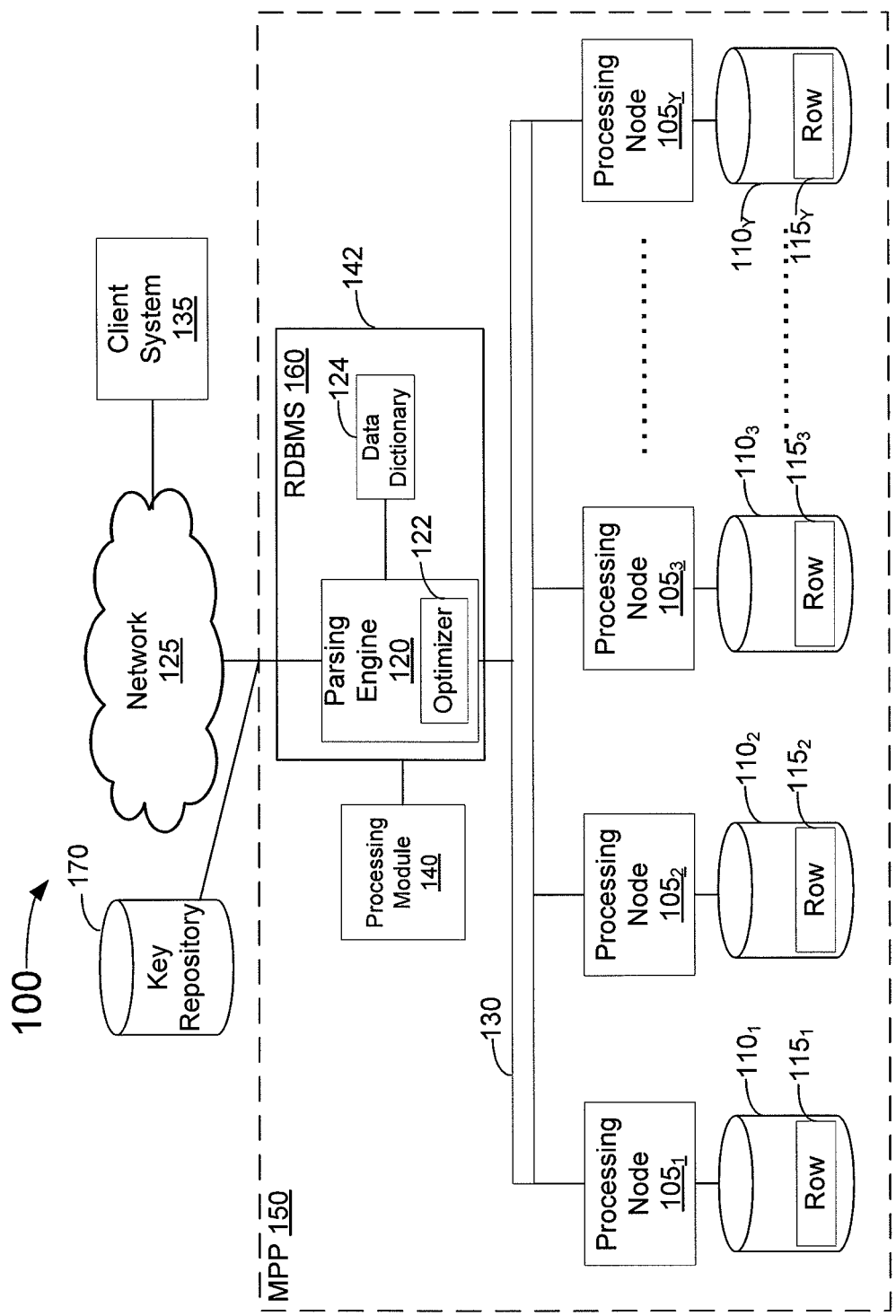
FIG. 1 depicts a diagrammatic representation of an exemplary architecture for a large database system that is suited for implementing mechanisms for cryptographic key rotation in accordance with disclosed embodiments.

FIG. 1 depicts a diagrammatic representation of an exemplary architecture for a large database system 100, such as a Teradata Active Data Warehouse System, that is suited for implementing mechanisms for cryptographic key rotation in accordance with disclosed embodiments. The database system 100 includes a relational database management system (RDBMS) 160 built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1...Y}$ includes one or more disk drives or other storage medium.

The system stores data in one or more tables in the data-storage facilities $110_{1...Y}$. The rows $115_{1...Y}$ of the tables are stored across multiple data-storage facilities $110_{1...Y}$ to ensure that the system workload is distributed evenly across the processing nodes $105_{1...Y}$. A parsing engine 120 organizes the storage of data and the distribution of table rows $115_{1...Y}$ among the processing nodes $105_{1...Y}$ and accesses processing nodes $105_{1...Y}$ via an interconnect 130. The parsing engine 120 also coordinates the retrieval of data from the data-storage facilities $110_{1...Y}$ in response to queries received from a user, such as one at a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_{1...Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The system 100 may include or communicatively interface with a key repository 170 (described more fully hereinbelow with reference to FIG. 8) that stores cryptographic keys used to cipher secure data. Further, the key repository 170 maintains in association with cryptographic keys' generation identifiers that facilitate key rotation in accordance with embodiments.

Figure 2:
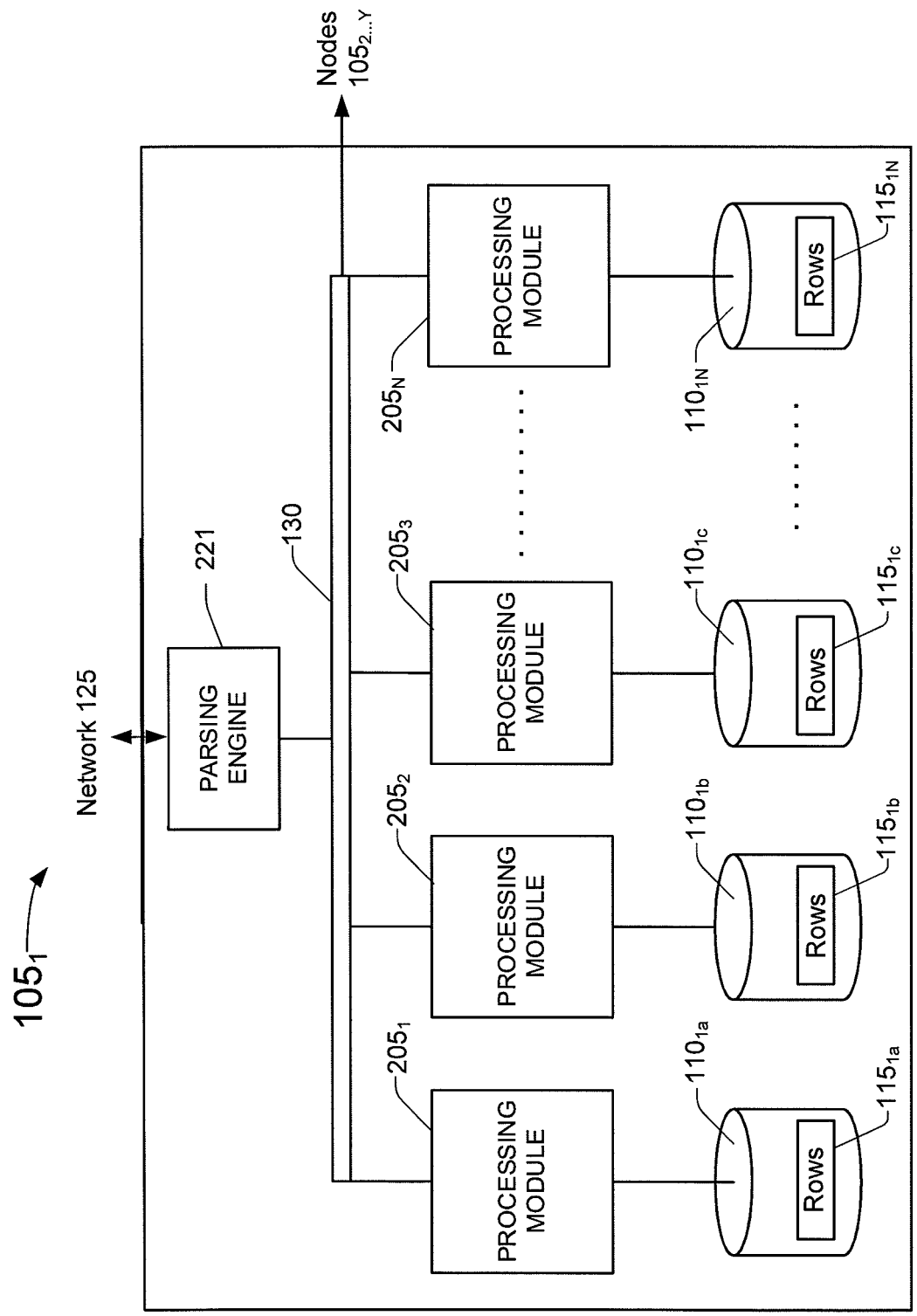
FIG. 2 depicts a diagrammatic representation of a sample architecture for one node of the system depicted in FIG. 1.

FIG. 2 depicts a diagrammatic representation of a sample architecture for one node $105_1$ of the DBS 100. The DBS node $105_1$ includes one or more processing modules $205_{1...N}$ connected by an interconnect 130 that manage the storage and retrieval of data in data-storage facilities $110_{1a...1N}$. Each of the processing modules $205_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1...N}$ manages a portion of a database that is stored in a corresponding one of the data-storage facilities $110_{1a...1N}$. Each of the data-storage facilities $110_{1a...1N}$ includes one or more disk drives.

The DBS may include multiple nodes $105_{2...Y}$ in addition to the illustrated node $105_1$, connected by way of the interconnect 130.

The system stores data in one or more tables in the data-storage facilities $110_{1a...1N}$. The rows $115_{1a...1N}$ of the tables are stored across multiple data-storage facilities $110_{1a...1N}$ to ensure that the system workload is distributed evenly across the processing modules $205_{1...N}$. A parsing engine 221 organizes the storage of data and the distribution of table rows $110_{1a...1N}$ among the processing modules $205_{1...N}$. The parsing engine 221 also coordinates the retrieval of data from the data-storage facilities $110_{1a...1N}$ in response to queries received from a user at a client computer system $135_{1...N}$. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
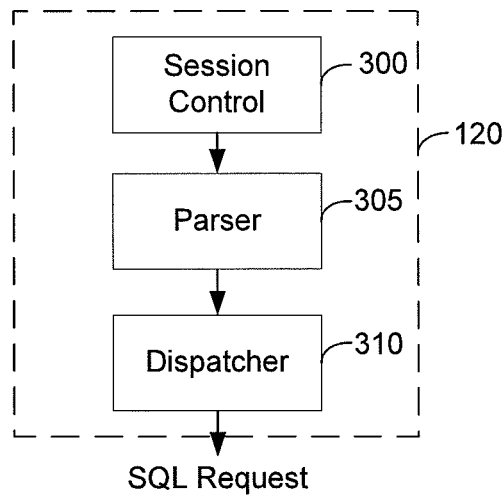
FIG. 3 is a diagrammatic representation of a parsing engine implemented in accordance with an embodiment.
Figure 4:
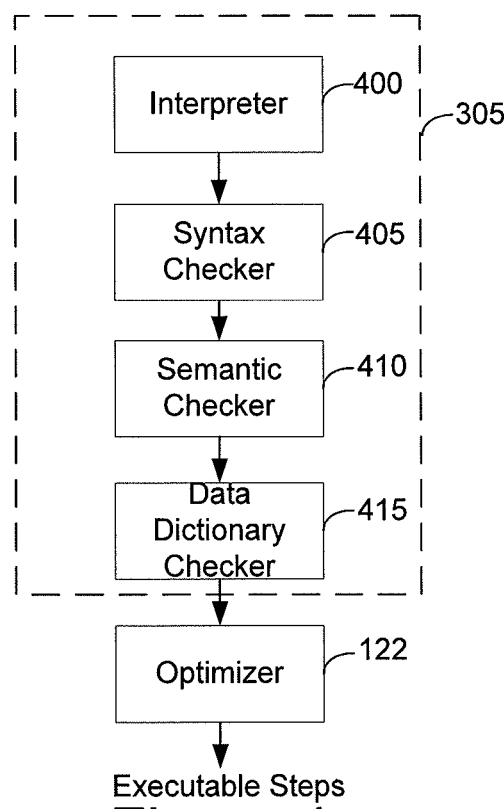
FIG. 4 is a diagrammatic representation of a parser implemented in accordance with an embodiment.

In one example system, a parsing engine, such as the parsing engine 120, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

FIG. 5 is a diagrammatic representation of an exemplary table 500 on which mechanisms for cryptographic key rotation may be implemented. Table 500 comprises a plurality of rows 510a-510j (collectively referred to as rows 510) and fields 520a-520i (collectively referred to as fields 520). Each record 510 comprises data elements in respective fields, or attributes, 520. In the present example, table 500 has a table name "Employee" and includes fields 520 having respective labels of "EmpNumber", "LastName", "FirstName", "Phone", "JobTitle", "DeptNo", "SSN", "Sex", and "Salary".

With a contemporary database encryption solution, cryptographic keys are securely generated and stored in a repository separate form the database itself—e.g., another database, file, or hardware security module (HSM). Keys are made available to be used by encryption/decryption functions as required. Further, all data encrypted within a single column of a table is encrypted using the same cryptographic key. In the illustrative example, the Employee table 500 contains information about employees. Each row 510 represents a record for each employee and contains the employee's social security number (SSN) in field 520g which is considered sensitive and to be protected using encryption.

There are many approaches that can be designed to associate generation information with a cryptographic key. As an example, a key repository 600, as depicted by the diagrammatic representation of FIG. 6, may include the generation information. Particularly, the key repository 600 includes a record that includes a table identifier 610 and corresponding column identifier 620 that specifies a column of the table that has been encrypted. A key identifier 630 specifies the key that was used for encrypting the corresponding column.

Whenever data within an encrypted column is inserted or updated, the encryption of the data will always select and use the latest generation of the cryptographic key as specified by the key identifier 630. The generation information is subsequently stored within the column along with the resulting cipher text. When data is selected from an encrypted column, the key is retrieved from the repository 600 to decrypted the encrypted data. Disadvantageously, when key rotation is performed, the database may be taken offline during the key rotation process. Further, the key rotation process tends to be CPU intensive and disruptive of normal query processing.

In accordance with disclosed embodiments, mechanisms are provided that facilitate key rotation without disrupting database access. Generation identifiers that specify a particular encryption key are stored in association with cipher text of encrypted columns. When data is to be read from an encrypted column, the cipher text is read along with the associated generation identifier. An encryption key corresponding to the generation identifier is then read to decrypt the cipher text. When data is to be written to the encrypted column, a most recent encryption key is retrieved from the key repository 170 to encrypt the data. The cipher text is then written to the encrypted column in association with the generation identifier of the key used to encrypt the data. Advantageously, the key rotation may be performed without requiring that the table or database to be taken offline or otherwise unavailable during key rotation.

Figures 7, 8:
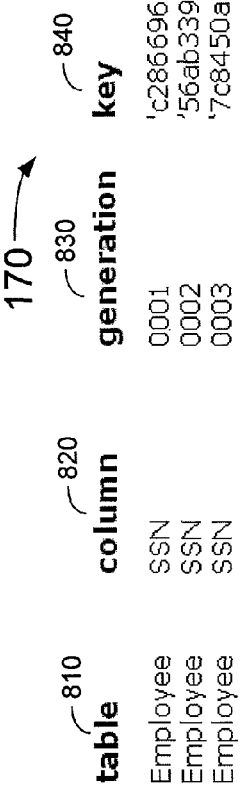
FIG. 7 is a diagrammatic representation of an exemplary table on which mechanisms for cryptographic key rotation may be implemented in accordance with disclosed embodiments.
FIG. 8 is a diagrammatic representation of a key repository implemented in accordance with disclosed embodiments.

FIG. 7 is a diagrammatic representation of an exemplary table 700 on which mechanisms for cryptographic key rotation may be implemented in accordance with disclosed embodiments. Table 700 comprises a plurality of rows 710a-710j (collectively referred to as rows 710) and fields 720a-720i (collectively referred to as fields 720). Each row 710 comprises data elements in respective fields, or attributes, 720. In the present example, table 700 has a table name "Employee" and includes fields 720 having respective labels of "EmpNumber", "LastName", "FirstName", "Phone", "JobTitle", "DeptNo", "SSN", "Sex", and "Salary".

In the illustrative example, the Employee table 700 contains information about employees. Each row 710 represents a record for each employee and contains the employee's social security number (SSN) in field 720g which is considered sensitive and to be protected using encryption. In accordance with disclosed embodiments, encryption generation information is stored in a field with the encrypted data. In a particular implementation, a generation identifier that specifies a particular encryption key is stored in the SSN field 720g along with the SSN cipher text. For example, row 720a includes cipher text ("*d5#AB[:0-GtW2<x") and a corresponding generation identifier ("0002") that is associated with an encryption key used to generate the cipher text. The generation identifier is stored in the encrypted field with the cipher text, e.g., by using a white space delimiter or other mechanism. When the cipher text is to be accessed, the generation identifier is retrieved from the column of a record along with the cipher text. An encryption key associated with the generation identifier is then retrieved from the key repository 170 to decrypt the cipher text.

A key repository 170 implemented in accordance with disclosed embodiments, as depicted by the diagrammatic representation of FIG. 8, includes encryption keys in association with generation identifiers. Particularly, the key repository 170 includes records that include a respective table identifier 810 and corresponding column identifier 820 that specifies a column of the table that has been encrypted. A generation identifier 830 is stored in association with an encryption key 840 that was used for encrypting data of a column of a particular row that specifies the generation identifier.

By maintaining information about multiple generations of cryptographic keys and associating the generation information with each cipher text value, the disclosed cryptographic mechanisms readily support a natural aging of data within a protected column while ensuring that the correct clear text value can be provided for any properly authorized request.

Advantageously, the described cryptographic mechanisms allow for a key rotation process without requiring that the table or database be offline or otherwise unavailable during key rotation. Key rotation is easily accomplished by simply selecting the data (resulting in a decryption using an old cryptographic key) and updating the data (resulting in an encryption using the new cryptographic key). Any access to the data during the key rotation process is guaranteed to produce the correct clear text result since the generation of the cryptographic key selected for the decryption will correspond to the key originally used to encrypt the data.

Figure 9:
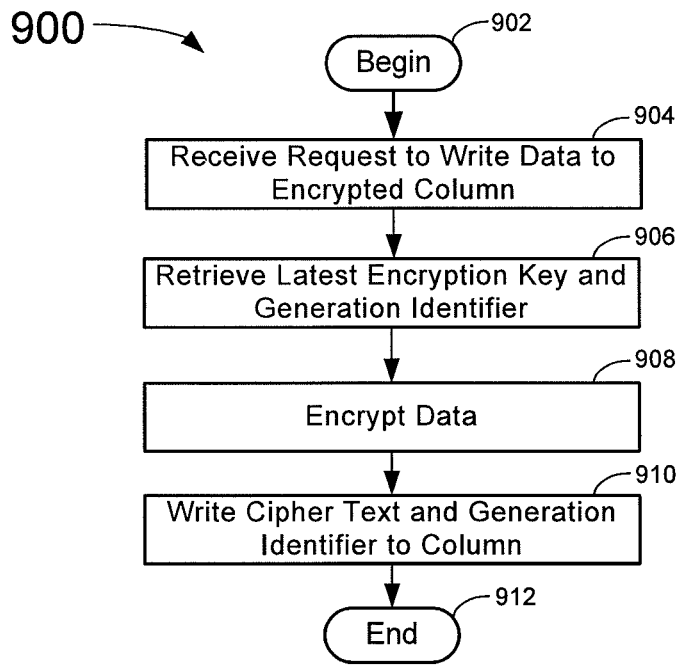
FIG. 9 is a flowchart of an encryption routine implemented in accordance with disclosed embodiments.

FIG. 9 is a flowchart 900 of an encryption routine implemented in accordance with disclosed embodiments. The processing steps of FIG. 9 may be implemented as computer-executable instructions tangibly embodied on a computer-readable medium executable by a processing system, such as the processing module 140 or a processing node $105_{1 \ldots Y}$ depicted in FIG. 1.

The encryption routine is invoked (step 902), and a request to write data to an encrypted column is received (step 904). For example, the request may comprise an SQL INSERT or UPDATE statement. The most recent encryption key corresponding to the column of the table on which the request is directed is then retrieved from the key repository 170 along with the generation identifier associated with the encryption key (step 906). The data to be written to the encrypted column is then encrypted with the retrieved key (step 908), and the resulting cipher text is written to the column with the generation identifier of the key used to encrypt the data (step 910). The encryption routine cycle may then end (step 912).

Figure 10:
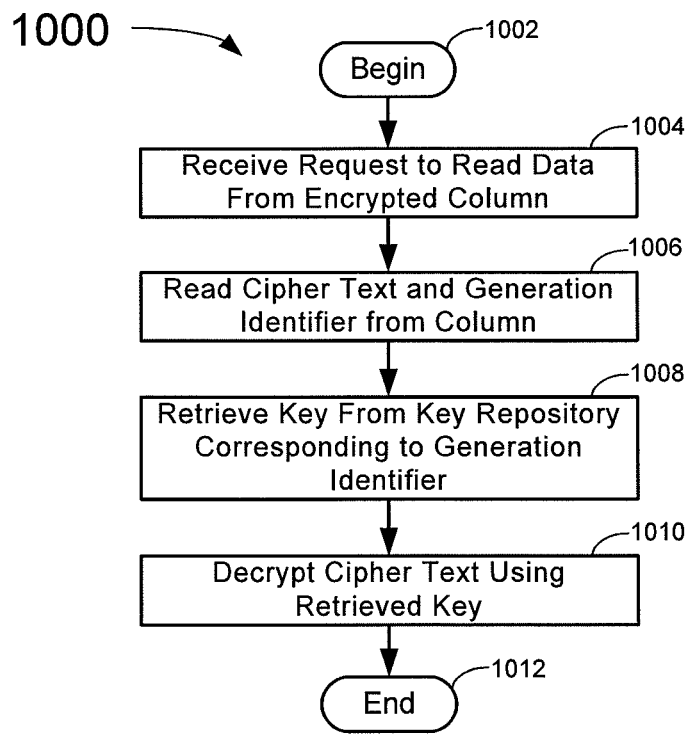
FIG. 10 is a flowchart of a decryption routine implemented in accordance with disclosed embodiments.

FIG. 10 is a flowchart 1000 of a decryption routine implemented in accordance with disclosed embodiments. The processing steps of FIG. 10 may be implemented as computer-executable instructions tangibly embodied on a computer-readable medium executable by a processing system, such as the processing module 140 or a processing node $105_{1 \ldots Y}$ depicted in FIG. 1.

The decryption routine is invoked (step 1002), and a request to read data from an encrypted column is received (step 1004). For example, the request may comprise an SQL SELECT statement. The cipher text of the encrypted column is then read along with the generation identifier stored therewith (step 1006). The key corresponding to the generation identifier read from the encrypted column is then retrieved from the repository 170 (step 1008). The cipher text of the encrypted column is then decrypted using the retrieved key (step 1010). The decryption routine cycle may then end (step 1012).

As described, mechanisms that facilitate key rotation without disrupting database access are provided. Generation identifiers that specify a particular encryption key are stored in association with cipher text of encrypted columns in database tables. When data is to be read from an encrypted column, the cipher text is read along with the associated generation identifier. An encryption key corresponding to the generation identifier is then read to decrypt the cipher text. When data is to be written to the encrypted column, a most recent encryption key is retrieved from the key repository to encrypt the data. The cipher text is then written to the encrypted column in association with the generation identifier of the key used to encrypt the data. Advantageously, the key rotation may be performed without requiring that the table or database to be taken offline or otherwise unavailable during key rotation. By maintaining information about multiple generations of cryptographic keys and associating the generation information with each cipher text value, the disclosed cryptographic mechanisms readily support a natural aging of data within a protected column while ensuring that the correct clear text value can be provided for any properly authorized request.

The flowcharts of FIGS. 9-10 depict process serialization to facilitate an understanding of disclosed embodiments and are not necessarily indicative of the serialization of the operations being performed. In various embodiments, the processing steps described in FIGS. 9-10 may be performed in varying order, and one or more depicted steps may be performed in parallel with other steps. Additionally, execution of some processing steps of FIGS. 9-10 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of encryption key management in a database system deployed in a computer system, comprising:
    storing a plurality of encryption keys each respectively in association with a generation identifier;
    encrypting respective data of rows of a column of a database table using a respective one of the plurality of encryption keys; and
    for each encrypted row of the column of the database table, storing, in the database table, cipher text resulting from encryption of the respective data and a respective generation identifier, wherein each respective generation identifier is configured to indicate the respective encryption key used to encrypt the data.

2. The method of claim 1, wherein storing a plurality of encryption keys comprises storing the plurality of encryption keys in an encryption key repository that is communicatively coupled to the database system.

3. The method of claim 1, wherein storing, in the database table, cipher text resulting from encryption of the respective data and a respective generation identifier comprises storing the respective generation identifier in a column of a row with the cipher text.

4. The method of claim 1, further comprising:
    receiving a request to access data of a column of a row of the database table;
    reading cipher text of the column of the row; and
    reading a respective generation identifier stored with the cipher text in the column of the row.

5. The method of claim 4, further comprising retrieving an encryption key corresponding to the respective generation identifier read from the column of the row.

6. The method of claim 5, further comprising decrypting the cipher text of the column of the row using the encryption key that corresponds to the respective generation identifier read from the column of the row.

7. The method of claim 1, further comprising:
    receiving a request to write data to a column of a row of the database table; and
    retrieving a most recent encryption key and an associated generation identifier from an encryption key repository.

8. The method of claim 7, further comprising:
    encrypting the data of the request with the most recent encryption key thereby producing cipher text; and
    writing the cipher text and the generation identifier associated with the most recent encryption key to the column of the row.

9. A computer-readable medium encoded with computer-executable instructions, the computer-executable instructions executable with a processor, the computer-readable medium comprising:
    instructions to store a plurality of encryption keys each respectively in association with a generation identifier;

instructions to encrypt respective data of rows of a column of the database table with a respective one of the plurality of encryption keys; and instructions to store, in the database table, for each encrypted row of the column of the database table, cipher text resulting from encryption of the respective data and a respective generation identifier, wherein each respective generation identifier is configured to indicate the respective encryption key used to encrypt the data.

10. The computer-readable medium of claim 9, wherein the instructions to store a plurality of encryption keys comprise instructions to store the plurality of encryption keys in an encryption key repository that is communicatively coupled to the database system.

11. The computer-readable medium of claim 9, wherein the instructions to store, in the database table, cipher text resulting from encryption of the respective data and a respective generation identifier comprise instructions to store the respective generation identifier in a column of a row with the cipher text.

12. The computer-readable medium of claim 9, further comprising:
  instructions to receive a request to access data of a column of a row of the database table;
  instructions to read cipher text of the column of the row; and
  instructions to read a generation identifier stored with the cipher text in the column of the row.

13. The computer-readable medium of claim 12, further comprising instructions to retrieve an encryption key corresponding to the respective generation identifier read from the column of the row.

14. The computer-readable medium of claim 13, further comprising instructions to decrypt the cipher text of the column of the row using the encryption key that corresponds to the respective generation identifier read from the column of the row.

15. The computer-readable medium of claim 9, further comprising:
  instructions to receive a request to write data to a column of a row of the database table; and
  instructions to retrieve a most recent encryption key and an associated generation identifier from an encryption key repository.

16. The computer-readable medium of claim 15, further comprising:
  instructions to encrypt the data of the request with the most recent encryption key thereby producing cipher text; and
  instructions to write the cipher text and the generation identifier associated with the most recent encryption key to the column of the row.

17. A computer system having a database system deployed therein configured for encryption key management, comprising:
  at least one storage medium on which the database system is stored; and
  at least one processing module that is configured to:
  store a plurality of encryption keys each respectively in association with a generation identifier;
  encrypt respective data of rows of a column of a database table, wherein each row is encrypted with a respective one of the plurality of encryption keys; and
  for each encrypted row of the column of the database table, store, in the database table, cipher text resulting from encryption of the respective data and a respective generation identifier, wherein each respective generation identifier is configured to indicate the respective encryption key used to encrypt the data.

18. The system of claim 17, wherein the at least one processing module is further configured to store the plurality of encryption keys in an encryption key repository that is communicatively coupled to the database system.

19. The system of claim 17, wherein the at least one processing module is further configured to store the respective generation identifier in a column of a row with the cipher text.

20. The system of claim 17, wherein the at least one processing module is further configured to:
  receive a request to access data of a column of a row of the database table;
  read cipher text of the column of the row; and
  read a generation identifier stored with the cipher text in the column of the row.

* * * * *